(12) United States Patent
Ichikawa et al.

(10) Patent No.: US 8,937,409 B2
(45) Date of Patent: Jan. 20, 2015

(54) POWER TRANSFER SYSTEM AND NONCONTACT CHARGING DEVICE

(75) Inventors: Keiichi Ichikawa, Nagaokakyo (JP); Henri Bondar, Kyoto (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 625 days.

(21) Appl. No.: 13/332,455

(22) Filed: Dec. 21, 2011

(65) Prior Publication Data
US 2012/0181980 A1 Jul. 19, 2012

Related U.S. Application Data

(63) Continuation of application No. PCT/JP2009/002921, filed on Jun. 25, 2009.

(51) Int. Cl.
H01F 27/42 (2006.01)
H02J 7/02 (2006.01)

(52) U.S. Cl.
CPC ..................... *H02J 7/025* (2013.01)
USPC ........................................................ 307/104

(58) Field of Classification Search
USPC ........................................................ 307/104
See application file for complete search history.

(56) References Cited

U.S. PATENT DOCUMENTS

| 6,040,773 | A | 3/2000 | Vega et al. |
| 6,411,213 | B1 | 6/2002 | Vega et al. |
| 6,611,199 | B1 * | 8/2003 | Geiszler et al. ............ 340/10.51 |
| 8,587,157 | B2 * | 11/2013 | Camurati et al. ............. 307/104 |
| 8,729,738 | B2 * | 5/2014 | Camurati et al. ............. 307/104 |
| 2009/0206675 | A1 * | 8/2009 | Camurati et al. ............. 307/104 |
| 2010/0320963 | A1 * | 12/2010 | Cheng et al. ................. 320/108 |

FOREIGN PATENT DOCUMENTS

| DE | 103 04 584 A1 | 8/2004 |
| JP | 2005-079786 A | 3/2005 |
| JP | 2009-089520 A | 4/2009 |
| WO | WO-97-14112 A1 | 4/1997 |
| WO | WO-2007-107642 A1 | 9/2007 |

OTHER PUBLICATIONS

PCT/JP2009/002921 International Search Report dated Sep. 18, 2009.
PCT/JP2009/002921 Written Opinion dated Sep. 18, 2009.

* cited by examiner

*Primary Examiner* — Jared Fureman
*Assistant Examiner* — Duc M Pham
(74) *Attorney, Agent, or Firm* — Dickstein Shapiro LLP

(57) ABSTRACT

A high-voltage side conductor is formed near the upper surface of a power transmission device, and a low-voltage side conductor is formed near the lower surface of the power transmission device. The power transmission device includes an alternating voltage generating circuit. A high-voltage side conductor is formed near the lower surface of a power reception device, and a low-voltage side conductor is formed near the upper surface of the power reception device. The power reception device includes a load circuit. When the high-voltage side conductors face a capacitive coupling conductor of an auxiliary sheet, capacitances are generated respectively between the high-voltage side conductors and the capacitive coupling conductor. Thus, the high-voltage side conductors are capacitively coupled to each other via the capacitive coupling conductor.

12 Claims, 10 Drawing Sheets

US 8,937,409 B2

POWER TRANSFER SYSTEM AND NONCONTACT CHARGING DEVICE

CROSS REFERENCE TO RELATED APPLICATIONS

The present application is a continuation of International application No. PCT/JP2009/002921, filed Jun. 25, 2009, the entire contents of which is incorporated herein by reference.

FIELD OF THE INVENTION

The invention relates to a power transfer system that transfers electric power in a noncontact manner and a noncontact charging device that uses the power transfer system.

BACKGROUND OF THE INVENTION

Patent Document 1 and Patent Document 2 describe existing techniques related to a noncontact power transfer system.

The power transfer system described in Patent Document 1 increases the efficiency of power transfer between a card reader/writer and a noncontact-type card. Two electrodes are provided for each of the card reader/writer and the noncontact-type card. When power is transferred, the electrodes of the card reader/writer face the electrodes of the noncontact-type card in a pair to transfer electric power through capacitive coupling.

The power transfer system described in Patent Document 1 transfers electric power by forming a symmetric electric dipole, while the power transfer system described in Patent Document 2 transfers electric power through mutual electrostatic induction in such a manner that asymmetric electric dipoles are formed to face coupling electrodes to each other at a short distance.

FIG. 1 is a view that shows the basic configuration of the power transfer system described in Patent Document 2. A power transmission device includes a high-frequency high-voltage generator 1, a passive electrode 2 and an active electrode 3. A power reception device includes a high-frequency high-voltage load 5, a passive electrode 7 and an active electrode 6. Then, the active electrode 3 of the power transmission device is located in proximity to the active electrode 6 of the power reception device via a gap 4 to capacitively couple these two electrodes.

PTL 1—Japanese Unexamined Patent Application Publication No. 2005-079786
PTL 2—Pamphlet of International Publication No. 2007/107642

SUMMARY OF THE INVENTION

However, in the power transfer system described in Patent Document 1, it is necessary to face the two electrodes of the power transmission device to the two electrodes of the power reception device. Thus, the power transmission device and the power reception device are arranged in a prescribed positional relationship. Therefore, there is a problem that the flexibility of arrangement of both the power transmission device and the power reception device is considerably low. In addition, the electrodes of each of the power transmission device and the power reception device have a symmetric configuration, and are isolated from a ground electrode of the circuit. Therefore, there is a problem that a voltage applied to each electrode increases. Furthermore, because the periphery of each electrode is not shielded, there is a problem that an unnecessary electric field (that does not contribute to power transfer) spreads around the electrodes.

In the power transfer system described in Patent Document 2, only the active electrodes face each other. Thus, a lower coupling is occurred and larger voltage is necessary for same distance and power conditions. When the active electrodes are larger to increase flexibility in positioning the electric field is not confined only in between the two facing parts of the active electrodes. Furthermore, there is a problem that, when alternative voltage of the passive electrode at the power reception device side are large, an electric field also similarly spreads therearound.

It is an object of the invention to provide a power transfer system that increases the flexibility of relative positional relationship between a power transmission device and a power reception device, that decreases a voltage applied to coupling electrodes, and that reduces spreading of an unnecessary electric field.

According to preferred embodiments of the invention, a power transfer system is configured as follows. A power transfer system includes: a power transmission device and a power reception device, each of which has a capacitive coupling electrode that is capacitively coupled to the capacitive coupling electrode of the device at the other side, wherein the capacitive coupling electrode of each of the power transmission device and the power reception device includes a high-voltage side conductor (active electrode) and a low-voltage side conductor (passive electrode) that is electrically insulated from the high-voltage side conductor; and a capacitive coupling conductor that is capacitively coupled to the high-voltage side conductor of each of the power transmission device and the power reception device, wherein the power transmission device includes an alternating voltage generating circuit that generates an alternating voltage that is applied between the high-voltage side conductor and low-voltage side conductor of the power transmission device, and the power reception device includes a load circuit of electric power induced between the high-voltage side conductor and low-voltage side conductor of the power reception device.

According to preferred embodiments of the invention, the capacitive coupling conductor is a sheet material that is formed so that a conductive film or a conductive thin wire is coated with an insulating film.

According to preferred embodiments of the invention, the capacitive coupling electrode of the power transmission device is a sheet-like conductive electrode that has an impedance value lower than a load impedance of the power reception device and higher than that of a good conductor.

According to preferred embodiments of the invention, the insulating film is formed so that the thickness of a side at which the capacitive coupling conductor faces the capacitive coupling electrode of the device at the other side differs from the thickness of a side opposite to the side at which the capacitive coupling conductor faces the capacitive coupling electrode of the device at the other side.

According to preferred embodiments of the invention, the dielectric constant of the insulating film from the capacitive coupling conductor to a surface at a side facing the device at the other side differs from the dielectric constant of the insulating film from the capacitive coupling conductor to a surface at a side opposite to the surface at the side facing the device at the other side.

According to preferred embodiments of the invention, a surface of the insulating film, at a side opposite to the side facing the device at the other side, is covered with a conductive film or a conductive sheet.

According to preferred embodiments of the invention, the conductive film or the conductive thin wire is, for example, a woven fabric that contains a conductive material.

According to preferred embodiments of the invention, the insulating film is, for example, made of a high dielectric material having a relative dielectric constant of about 7 or above.

According to preferred embodiments of the invention, a noncontact charging device includes any one of the above described power transfer system, the load circuit includes a rectifying smoothing circuit that rectifies and smoothes an alternating voltage induced between the high-voltage side conductor and low-voltage side conductor of the power reception device and a charging element that is charged with an output from the rectifying smoothing circuit, and the power transmission device is provided with a control circuit that controls the alternating voltage generating circuit to control charging to the charging element or the load circuit is provided with a control circuit that controls the rectifying smoothing circuit to control charging to the charging element.

According to the above preferred embodiments of the invention, the following advantageous effects may be obtained. The allowance to a relative positional deviation between the power transmission device and the power reception device increases to thereby improve convenience. The degree of coupling between the power transmission device and the power reception device increases, power transfer efficiency may be improved, and the size of the device may be reduced. Because the power transfer efficiency is improved, it is possible to increase an upper limit of electric power that can be transferred. Because the degree of coupling increases, it is possible to decrease a set voltage applied to the central conductor of the power transmission device. In accordance with this, it is possible to decrease the electric potential of the high voltage side conductor of the power reception device. The central conductor is electrostatically shielded by a structure such that the peripheral conductor surrounds the high voltage side conductor, so an unnecessary radiation may be reduced when the conductive layer is configured at the opposite surface of the sheet, and the conductive layer is connected to the ground level.

DETAILED DESCRIPTION OF THE INVENTION

First Embodiment

Figure 1:
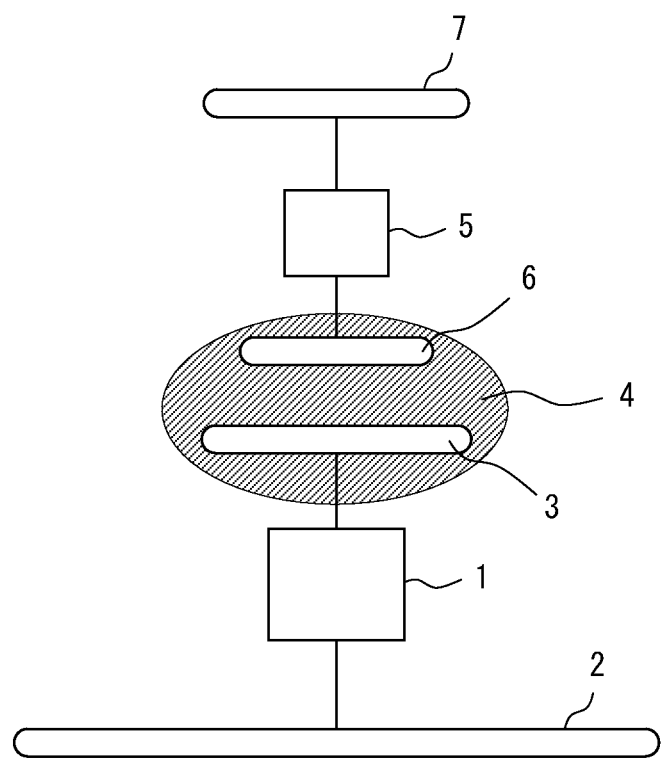
FIG. 1 is a view that shows the basic configuration of a power transfer system described in Patent Document 2.
Figure 2:
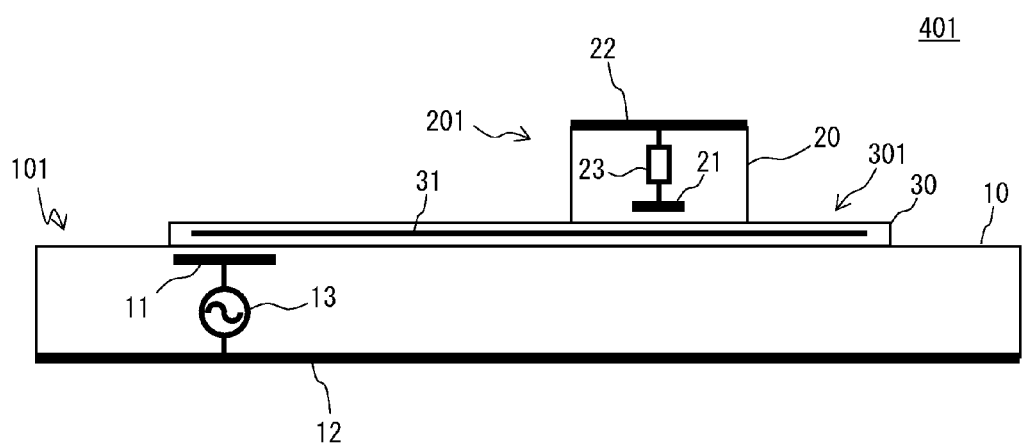
FIG. 2 is a cross-sectional view that conceptually shows a relevant portion of a power transfer system 401.

The configuration of a power transfer system according to a first embodiment will be described with reference to FIG. 2 to FIG. 4. FIG. 2 is a cross-sectional view that conceptually shows a relevant portion of a power transfer system 401. The power transfer system 401 includes a power transmission device 101, a power reception device 201 and an auxiliary sheet 301. A high-voltage side conductor 11 is formed near the upper surface of a casing 10 of the power transmission device 101. A low-voltage side conductor 12 is formed near the lower surface of the casing 10 of the power transmission device 101. In addition, an alternating voltage generating circuit 13 is provided inside the casing 10 of the power transmission device 101 and applies an alternating voltage between the high-voltage side conductor 11 and the low-voltage side conductor 12. In this example, the low-voltage side conductor 12 is widely arranged along the lower surface of the casing 10.

A high-voltage side conductor 21 is formed near the lower surface of a casing 20 of the power reception device 201. A low-voltage side conductor 22 is formed near the upper surface of the casing 20 of the power reception device 201. In addition, a load circuit 23 is provided inside the casing 20 of the power reception device 201, and a voltage induced between the high-voltage side conductor 21 and the low-voltage side conductor 22 is applied to the load circuit 23.

The auxiliary sheet 301 is placed on the upper surface of the power transmission device 101. The auxiliary sheet 301 is a substantially sheet-like member in which a capacitive coupling conductor 31 is coated with an insulator 30. The power reception device 201 is arranged on the auxiliary sheet 301 so that the high-voltage side conductor 21 of the power reception device 201 faces the auxiliary sheet 301.

Figure 3A:
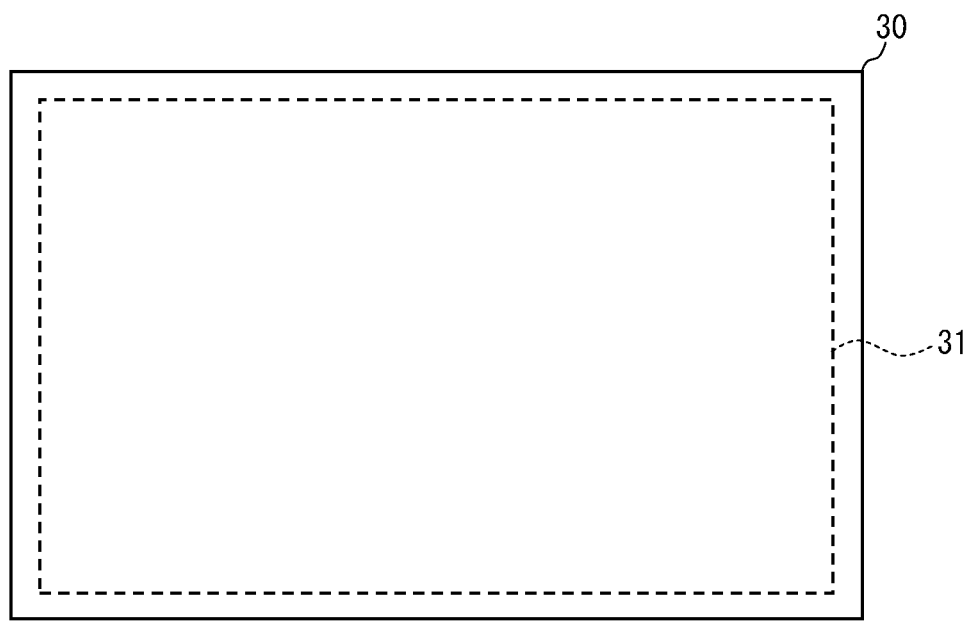
FIG. 3A is a top view of an auxiliary sheet 301.
Figure 3B:
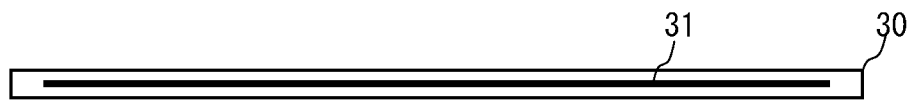
FIG. 3B is a cross-sectional view of the auxiliary sheet 301.

FIG. 3A is a top view of the auxiliary sheet 301. FIG. 3B is a cross-sectional view of the auxiliary sheet 301. The capacitive coupling conductor 31 may be formed of woven fabric made of thin metal wire, metal foil, or the like. Usually, the capacitive coupling conductor 31 is coated with an insulating film, such as resin, foamed material, glass, ceramics, and cloth. In addition, to prevent a local increase in strength of an electric field, the capacitive coupling conductor 31 has almost no sharp portion.

The insulating film is a high dielectric material, such as, having a relative dielectric constant of about 7 or above. In this way, by using a high dielectric material, it is possible to increase a coupling capacitance between the high-voltage side conductors 11 and 21 and, as a result, power transfer efficiency improves.

It can be possible to enhance the level of coupling by replacing with the high dielectric constant material at the coupled portion. Also available is ceramic material whose relative dielectric constant is 7, for example.

As shown in FIG. 2, in a state where the auxiliary sheet 301 is placed on the power transmission device 101, the high-voltage side conductor 11 of the power transmission device is capacitively coupled to the capacitive coupling conductor 31 of the auxiliary sheet 301. In addition, in a state where the power reception device 201 is placed on the auxiliary sheet 301, the high-voltage side conductor 21 of the power reception device is capacitively coupled to the capacitive coupling conductor 31 of the auxiliary sheet 301. Thus, the high-voltage side conductor 11 of the power transmission device is capacitively coupled to the high-voltage side conductor 21 of the power reception device via the auxiliary sheet 301.

On the other hand, the low-voltage side conductor 12 of the power transmission device 101 is capacitively coupled to the low-voltage side conductor 22 of the power reception device 201. Thus, the high-voltage side conductors 11 and 21, the low-voltage side conductors 12 and 22 and the capacitive coupling conductor 31 of the auxiliary sheet 301 operate as capacitive coupling electrodes.

If the power reception device 201 is a wireless mouse, and the auxiliary sheet 301 is a mouse pad, in a state where the mouse is operated by hand, a capacitance is generated between the palm of a human body and the low-voltage side conductor 22, and a capacitance is generated between the body and the low-voltage side conductor 12. Thus, it is also possible to couple the low-voltage side conductors 12 and 22 at a large capacitance.

The alternating voltage generating circuit 13 is a circuit that uses a coil transformer, a piezoelectric transformer, an LC resonant circuit, or the like, to generate a high-frequency high-voltage of, for example, about 100 kHz to several tens of MHz. The load circuit 23 includes a rectifying smoothing circuit and a low-voltage circuit that operates on a voltage output from the rectifying smoothing circuit. The rectifying smoothing circuit is formed of a diode bridge circuit and a smoothing capacitor. In the case of an alternating load, the alternating load is supplied with an alternating voltage using a step-down transformer or a voltage dividing circuit that directly decreases an alternating voltage without rectifying.

The low-voltage side conductor 12 of the power transmission device 101 has a reference potential (ground potential) of the alternating voltage generating circuit 13. In addition, the low-voltage side conductor 22 of the power reception device 201 has a reference potential (ground potential) of the load circuit 23. Thus, the high-voltage side conductors 11 and 21 operate as active electrodes, while the low-voltage side conductors 12 and 22 operate as passive electrodes.

Wherever the power reception device 201 is placed on the auxiliary sheet 301, the above described relationship is satisfied. Thus, it is possible to efficiently transfer electric power.

The power transfer system according to the embodiment of the invention has basic principles on short-range energy transfer using an alternative electromagnetic field (quasi-static electric field). When a wavelength lambda is sufficiently longer than the size or operating range (distance d) of an electric field oscillating source, that is, when the relationship $$d/\text{lambda} \ll 1$$

is satisfied, a quasi-static electric field stays (is bound) near the electric field oscillating source. Thus, a radiant quantity to a distant place is vanishingly small.

Note that electromagnetic waves have transverse modes (fields propagates in a direction perpendicular to both fields), whereas, in a power transfer that uses a quasi-static electric field as in the case of the embodiment of the invention, energy is transferred in the same direction as an electric field. In a low-frequency band in which a quasi-static electric field is handled. That is, the figure "Z=V/I" is available. ("Z" is an impedance, "V" is a voltage, "I" is a current)

The casings 10 and 20 are, for example, plastics, such as ABS resin. By integrally forming a conductor layer inside the plastic casing, the outer surface of each casing may be electrically insulated. Thus, if a high voltage higher than or equal to about several hundreds of volts is applied to the high-voltage side conductor 11, safety may be ensured.

Figure 8A:
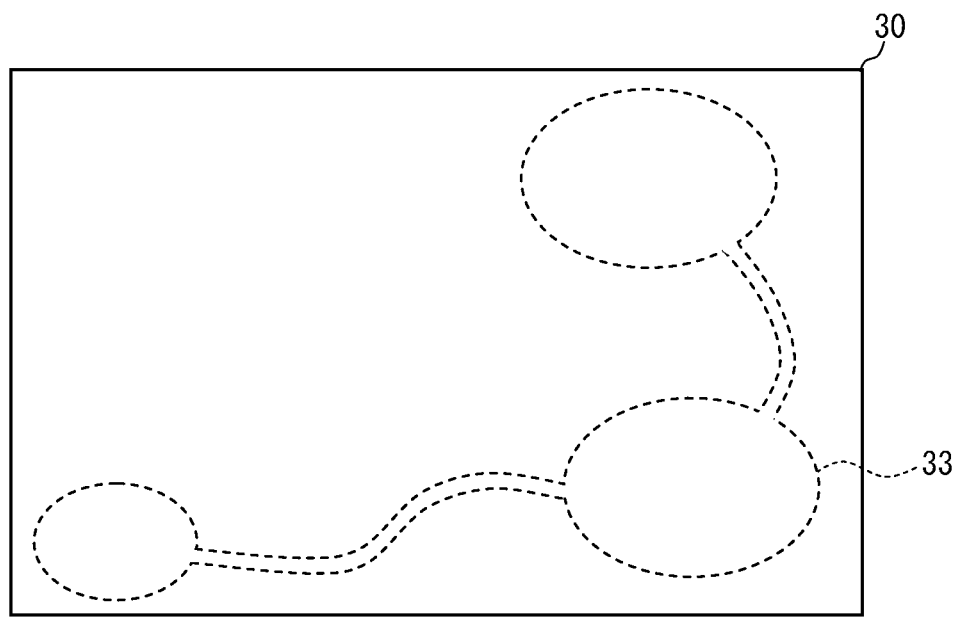
FIG. 8A is a configuration diagram of an auxiliary sheet used in a power transfer system according to a third embodiment.

The high-voltage side conductor 11 is made of a conductive material having an impedance value higher than a good conductor, such as a metal, and having an impedance value lower than a load impedance. For example, the conductive material may be a finely patterned sheet formed of a metal thin film or a sheet-like resistive material. In this case, the load impedance corresponds to an impedance of the power reception device as viewed from the power transmission device side. For example, when the load impedance is, for example, 1 M ohm, the resistance value of the high-voltage side conductor 11 is set to about 100 k ohm. Thus, it is only necessary that the resistance value of the high-voltage side conductor 11 is appropriately set on the basis of a voltage and electric energy used. When capacitive coupling electrodes are arranged in an island shape as shown in FIG. 8A, it is not problematic even when the capacitive coupling electrodes are connected by a low-resistance material. With the above configuration, even if the outer surface of the casing is torn and the high-voltage side conductor is exposed, it is possible to prevent a spark, or the like, that occurs at the instant when a human body touches it.

In the structure shown in FIG. 2, numerical specific examples are as follows. The alternating voltage generating circuit 13 generates a high voltage within the range of about several hundreds of volts to about several kilovolts. It is desirable to set the high voltage at about 3 kV or below in order to prevent local corona discharge onset. The frequency is determined within the range of about 100 kHz to about 10 MHz. When the frequency is equal to or higher than a certain frequency, electromagnetic waves are radiated from the high-voltage side conductors 11 and 21. Thus, the upper limit of the frequency is restricted because of a radiation loss of electromagnetic waves.

When transferred power is lower than or equal to about 50 W, the size of the high-voltage side conductor 11 of the power transmission device 101 is about diameter 10 mm to about 30 mm as a measure. The size of each of the high-voltage side conductors 11 and 21 is determined on the basis of restrictions, such as a necessary transferred power, a power transfer efficiency, and the physical shape of a product. For example, when a power larger than or equal to about 50 W is handled, the size of an electrode may be equal to or larger than about diameter 30 mm, whereas, when a minute power is handled, the size of an electrode may be smaller than or equal to about 10 mm. The above described various conditions are used in a specific case, and are not limited to these values or ranges.

Figure 4A:
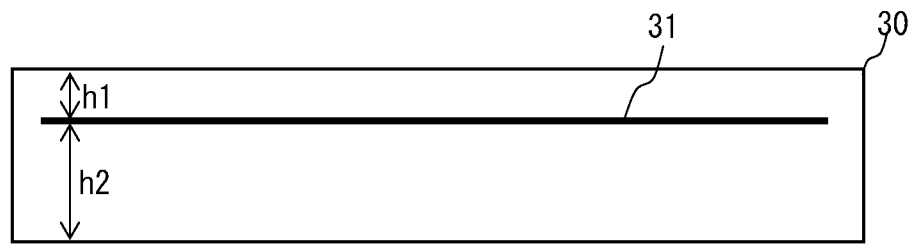
FIG. 4A is a cross-sectional view of the auxiliary sheet 301 according to an alternative embodiment.
Figure 4B:
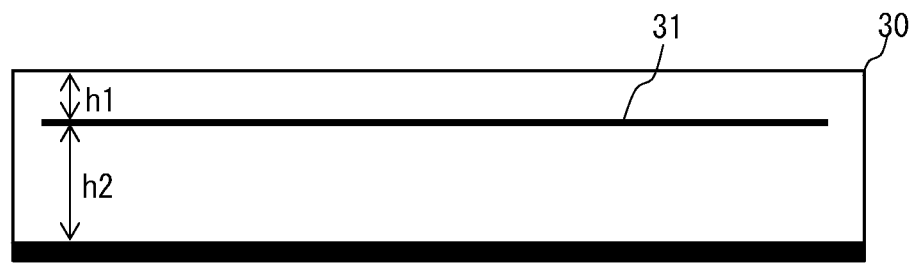
FIG. 4B is a cross-sectional view of the auxiliary sheet 301 in which a conductor is provided on a lower surface of the auxiliary sheet according to the alternative embodiment.

FIG. 4A is a cross-sectional view of the auxiliary sheet 301 according to an alternative embodiment. FIG. 4B is a cross-sectional view when a conductor is provided over the entire lower surface of the auxiliary sheet 301 of FIG. 4A. In this case, the capacitive coupling conductor 31 is not necessarily arranged at the center in the vertical direction of the auxiliary sheet 301. When a distance h1 to the upper surface of the auxiliary sheet 301 and a distance h2 to the lower surface thereof have a relationship h1<h2, a degree of coupling increases.

Figure 5A:
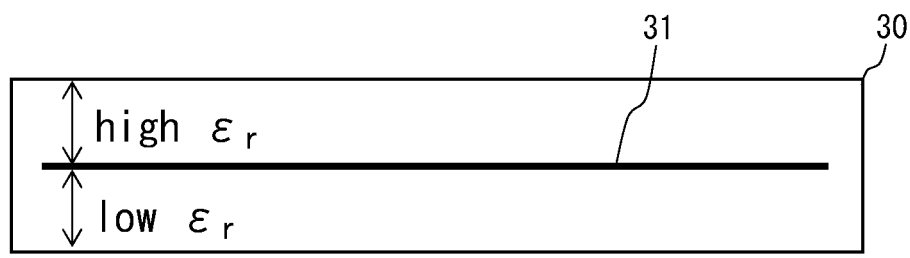
FIG. 5A is a cross-sectional view of the auxiliary sheet 301 according to another alternative embodiment.
Figure 5B:
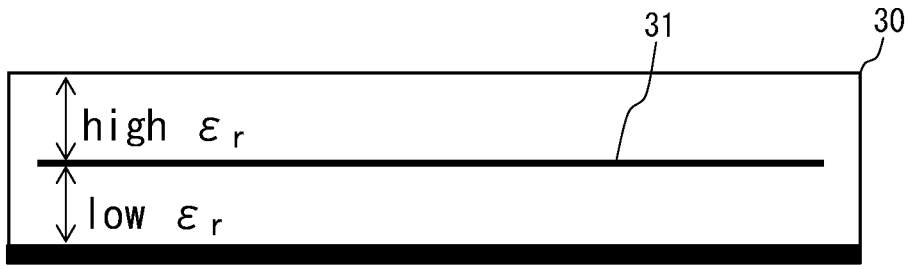
FIG. 5B is a cross-sectional view of the auxiliary sheet 301 in which a conductor is provided on a lower surface of the auxiliary sheet according to the alternative embodiment.

FIG. 5A is a cross-sectional view of the auxiliary sheet 301 according to another alternative embodiment, FIG. 5B is a cross-sectional view when a conductor is provided over the entire lower surface of the auxiliary sheet 301 of FIG. 5A. In this case, the capacitive coupling conductor 31 arranged in the auxiliary sheet 301 is arranged at substantially the center in the thickness direction of the auxiliary sheet 301. With respect to the capacitive coupling conductor 31 as a boundary, a material adjacent to the upper surface of the auxiliary sheet 301 has a relatively high dielectric constant, and a material adjacent to the lower surface thereof has a relatively low dielectric constant. For example, the high dielectric constant material has epsilon r: about 7 or above, and the low dielectric constant material has epsilon r: about 2 or below. With the above configuration, it is possible to increase a degree of coupling.

Figure 6:
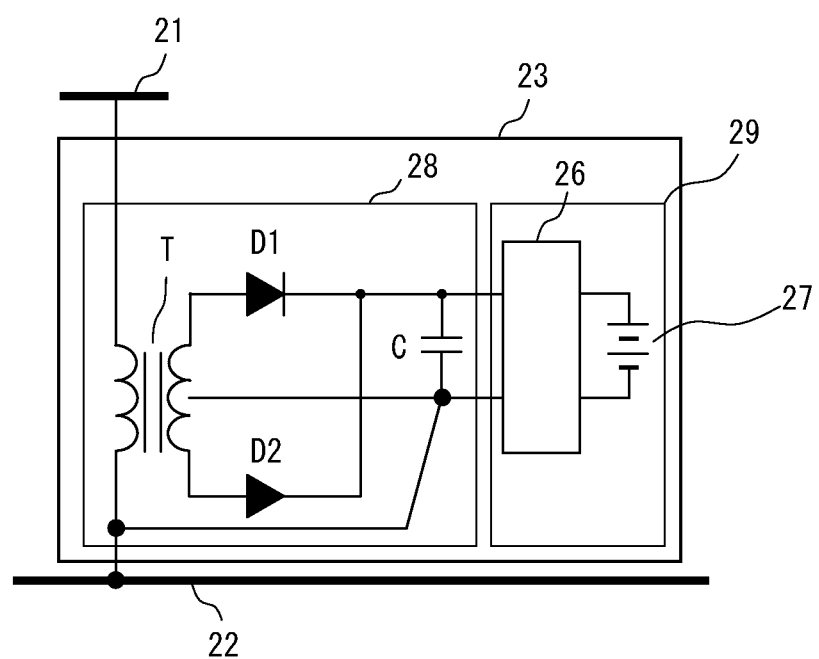
FIG. 6 is a view that shows the circuit configuration of a load circuit 23 provided inside a power reception device 201 shown in FIG. 2.

FIG. 6 is a view that shows the circuit configuration of the load circuit 23 provided inside the power reception device 201 shown in FIG. 2. The load circuit 23 includes a rectifying smoothing circuit 28 and a low-voltage circuit portion 29. The rectifying smoothing circuit 28 includes a step-down transformer T, rectifier diodes D1 and D2 and a smoothing capacitor C. One end of a primary coil of the transformer T is connected to the high-voltage side conductor 21, and the other end is connected to the low-voltage side conductor 22. A full-wave rectifying circuit including the rectifier diodes D1 and D2 and the smoothing capacitor C is formed in a secondary coil of the transformer T.

A resonant circuit may be formed in the rectifying smoothing circuit 28. Alternatively, a resonant circuit may be provided upstream of the rectifying smoothing circuit 28. The following advantageous effect may be obtained by providing a resonant circuit. The power transmission device 101 and the power reception device 201 are coupled to each other at a degree of coupling k (k<1). When no resonant circuit is incorporated, uncoupled energy will be a loss. That is, the power transfer efficiency is low. When a resonant circuit is provided, it is possible to store uncoupled energy in the resonant circuit as reactive energy. This may be understood that an energy loss in the case of no resonant circuit is recycled. In addition, it may also be understood that the Q factor of the resonant circuit increases an equivalent coupling coefficient. As a result, the power transfer efficiency may be improved. Particularly, when the degree of coupling is weak (k<<1), the advantageous effect appears remarkably.

In this example, the power transfer system 401 constitutes a noncontact charging device, and the low-voltage circuit portion 29 includes a control circuit 26 and a secondary battery 27, which operate on a voltage rectified and smoothed by the rectifying smoothing circuit 28 as a power supply. The control circuit 26 controls charging of the secondary battery 27, controls charging using the secondary battery 27 as a power supply, and carries out a predetermined circuit operation other than those. If the power reception device 201 is a mouse, it may be used as a mouse that does not require replacement of a battery.

Note that it is also applicable that a device for monitoring the state of charge of the secondary battery 27 through communication is provided, and a circuit for controlling charging of the secondary battery 27 is provided at the power transmission device 101 side. The above described configuration may be similarly applied to a charging element, such as an electric double layer, other than the secondary battery.

Second Embodiment

Figure 7A:
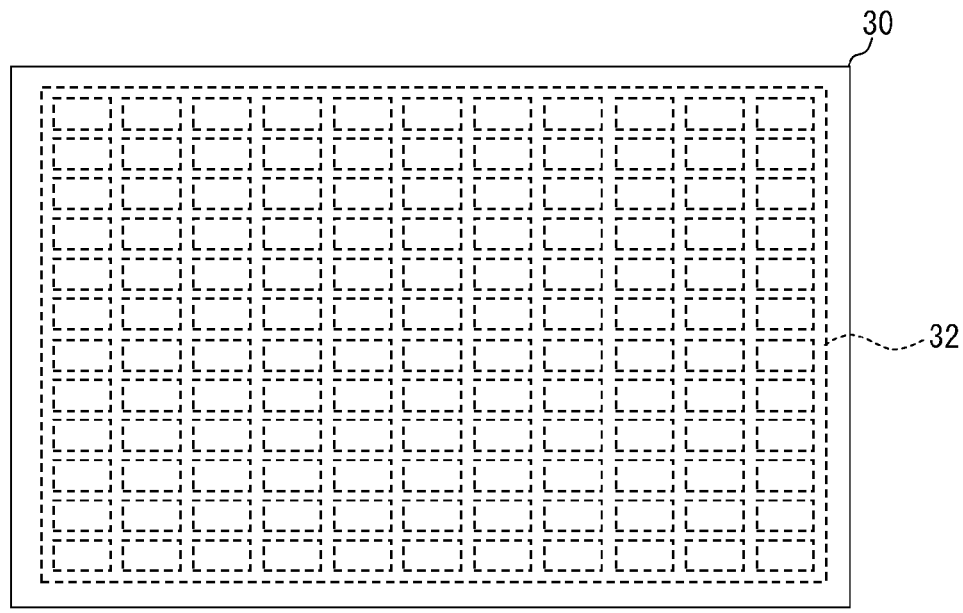
FIG. 7A is a configuration diagram of an auxiliary sheet used in a power transfer system according to a second embodiment.
Figure 7B:
FIG. 7B is a configuration diagram of an auxiliary sheet used in a power transfer system according to a second embodiment.

FIG. 7A and FIG. 7B are configuration diagrams of an auxiliary sheet 302 used in a power transfer system according to a second embodiment. FIG. 7A is a top view of the auxiliary sheet 302. FIG. 7B is a cross-sectional view of the auxiliary sheet 302. A capacitive coupling conductor 32 is formed so that a mesh material formed by stamping a metal foil, such as copper foil, is coated with an insulating film, such as resin, foamed material, glass, and ceramics. By forming the inside capacitive coupling conductor 32 in a mesh shape, adhesion between the capacitive coupling conductor 32 and the insulating film improves, thus making it difficult to peel off.

The configuration of the power transmission device 101 and power reception device 201, other than the auxiliary sheet, is similar to that shown in FIG. 2. In this way, with the mesh capacitive coupling conductor 32, a stray capacitance between the low-voltage side conductor 22 of the power reception device 201 and the capacitive coupling conductor 32 is reduced. Thus, a capacitance generated between the low-voltage side conductor 12 of the power transmission device 101 and the low-voltage side conductor 22 of the power reception device 201 increases by that much. Hence, it is possible to increase the degree of coupling between the power transmission device 101 and the power reception device 201. However, if the roughness of the mesh is excessive, a capacitance between the capacitive coupling conductor 32 and the high-voltage side conductor 11 of the power transmission device 101 and a capacitance between the capacitive coupling conductor 32 and the high-voltage side conductor 21 of the power reception device 201 respectively reduce. Thus, the roughness of the mesh should be appropriate.

Third Embodiment

Figure 8B:
FIG. 8B is a configuration diagram of an auxiliary sheet used in a power transfer system according to a third embodiment.

FIG. 8A and FIG. 8B are configuration diagrams of an auxiliary sheet used in a power transfer system according to a third embodiment. FIG. 8A is a top view of the auxiliary sheet 303. FIG. 8B is a cross-sectional view of the auxiliary sheet 303. A capacitive coupling conductor 33 is formed so that a metal foil or a mesh conductor, such as copper foil, stamped into a predetermined pattern, is coated with an insulating film, such as resin, foamed material, glass, and ceramics. The configuration of the power transmission device 101 and power reception device 201, other than the auxiliary sheet, is similar to that shown in FIG. 2.

By holding the capacitive coupling conductor in a predetermined pattern between insulators, it is possible to select the shape of the capacitive coupling conductor 33 interposed between the power transmission device 101 and the power reception device 201 for capacitive coupling. For example, when a position at which the power reception device 201 is placed is substantially predetermined, the areally expanded capacitive coupling conductor 33 is provided only at that position to achieve efficient capacitive coupling. That is, by not placing the areally expanded capacitive coupling conductor 33 to other positions, a stray capacitance between the low-voltage side conductor 22 of the power reception device 201 and the capacitive coupling conductor 32 is reduced. Thus, a capacitance generated between the low-voltage side conductor 12 of the power transmission device 101 and the low-voltage side conductor 22 of the power reception device 201 increases by that much. Hence, it is possible to increase the degree of coupling between the power transmission device 101 and the power reception device 201.

Fourth Embodiment

Figure 9A:
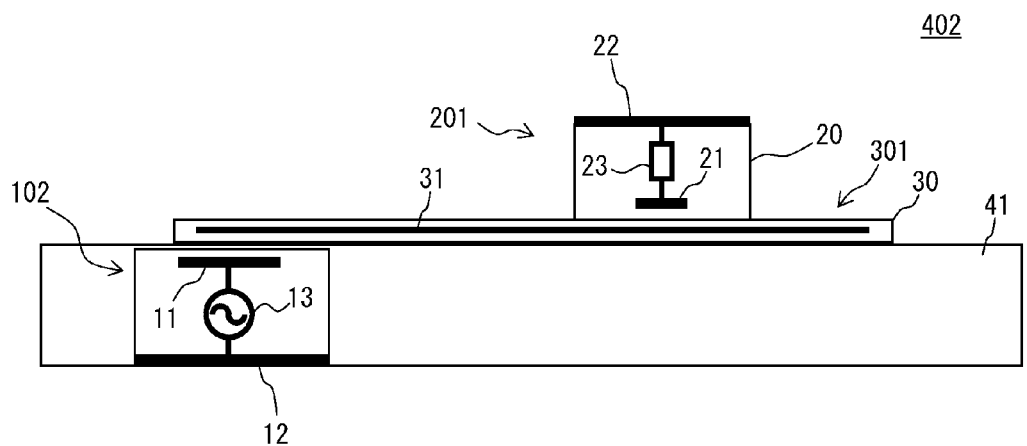
FIG. 9A is a cross-sectional view that conceptually show relevant portions of a power transfer system 402.
Figure 9B:
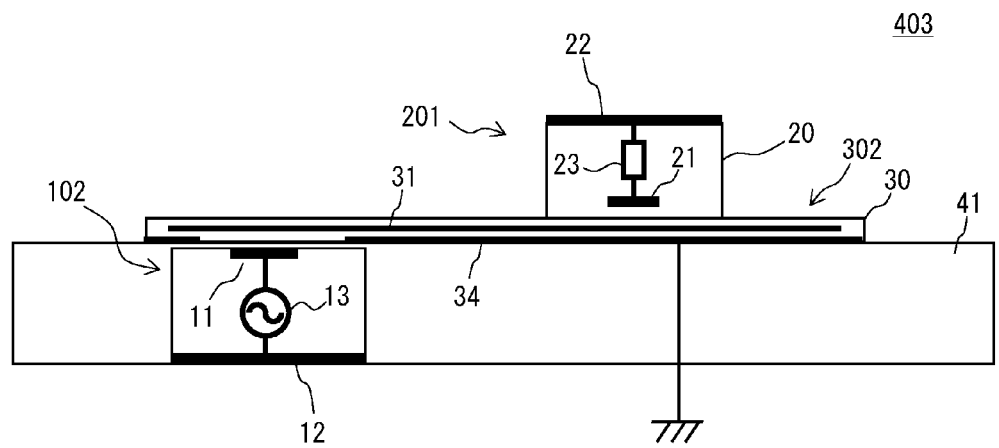
FIG. 9B is a cross-sectional view that conceptually show relevant portions of a power transfer system 403.

FIG. 9A and FIG. 9B are cross-sectional views that conceptually show relevant portions of two power transfer systems 402 and 403. The power transfer system 402 shown in FIG. 9A includes a power transmission device 102, a power reception device 201 and an auxiliary sheet 301. The power transmission device 102 is provided inside a plate material 41. A high-voltage side conductor 11 is formed near the upper surface of the power transmission device 102. A low-voltage side conductor 12 is formed near the lower surface of the power transmission device 101. In addition, an alternating voltage generating circuit 13 is provided inside the power transmission device 101 and applies an alternating voltage between the high-voltage side conductor 11 and the low-voltage side conductor 12.

A high-voltage side conductor 21 is formed near the lower surface of a casing 20 of the power reception device 201. A low-voltage side conductor 22 is formed near the upper surface of the casing 20 of the power reception device 201. In addition, a load circuit 23 is provided inside the casing 20 of the power reception device 201, and a voltage induced between the high-voltage side conductor 21 and the low-voltage side conductor 22 is applied to the load circuit 23.

An auxiliary sheet 301 is placed on the upper surface of the plate material 41. The auxiliary sheet 301 is a substantially sheet-like member in which a capacitive coupling conductor 31 is coated with an insulator 30, and is similar to those of the first to third embodiments. The power reception device 201 is arranged on the auxiliary sheet 301 so that the high-voltage side conductor 21 of the power reception device 201 faces the auxiliary sheet 301.

The power transfer system 403 shown in FIG. 9B includes a power transmission device 102, a power reception device 201 and an auxiliary sheet 302. The power transmission device 102 is provided inside a plate material 41. A high-voltage side conductor 11 is formed near the upper surface of the power transmission device 102. A low-voltage side conductor 12 is formed near the lower surface of the power transmission device 101. In addition, an alternating voltage generating circuit 13 is provided inside the power transmission device 102 and applies an alternating voltage between the high-voltage side conductor 11 and the low-voltage side conductor 12.

If a back conductor 34 is connected to the ground, an unnecessary radiation may be effectively reduced. Furthermore, if the low-voltage side conductor 12 is also connected to the ground, it may be more effective. In those cases, coupling level is also reduced, so it is necessary to arrange the parameter of the system in according to the purpose.

With the above configuration, the back conductor 34 is interposed between the capacitive coupling conductor 31 and the plate material 41, and, therefore, stable coupling characteristic may be obtained without any influence received from the material of the plate material 41, if grounded.

Fifth Embodiment

Figure 10A:
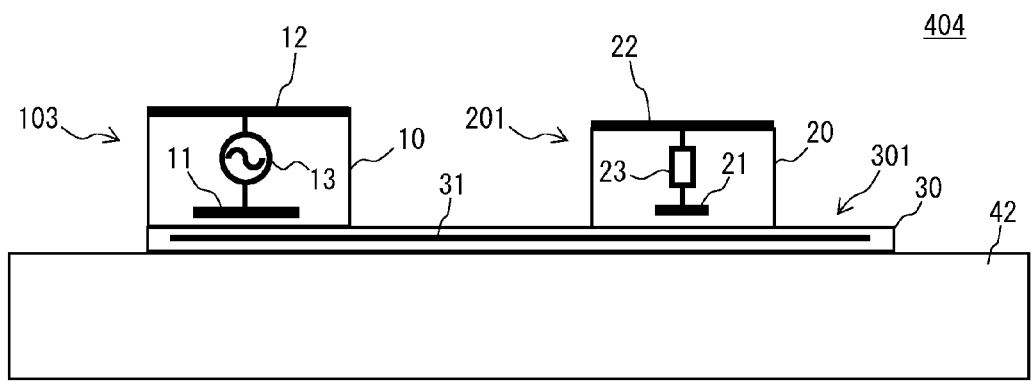
FIG. 10A is a cross-sectional view that conceptually show relevant portions of a power transfer system 404.
Figure 10B:
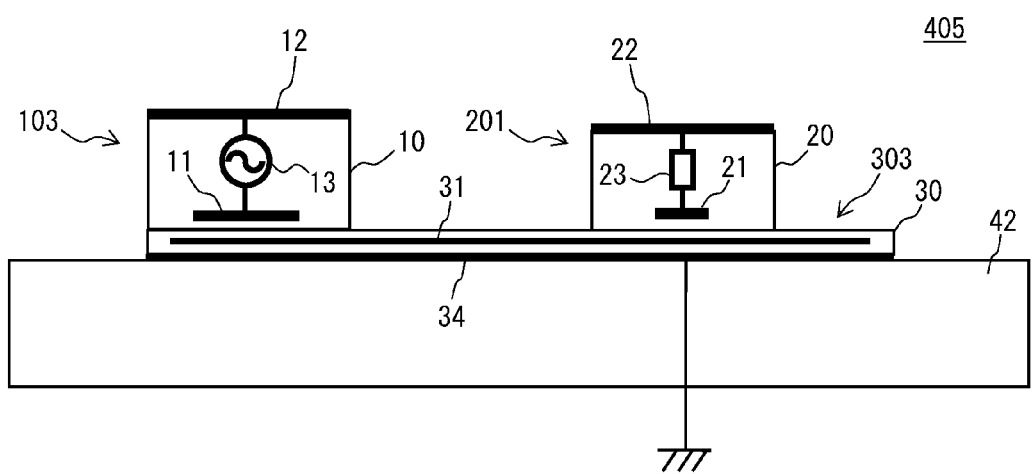
FIG. 10B is a cross-sectional view that conceptually show relevant portions of a power transfer system 405.

FIG. 10A and FIG. 10B are cross-sectional views that conceptually show relevant portions of two power transfer systems 404 and 405. The power transfer system 404 shown in FIG. 10A includes a power transmission device 103, a power reception device 201 and an auxiliary sheet 301. A high-voltage side conductor 11 is formed near the lower surface of the power transmission device 103. A low-voltage side conductor 12 is formed near the upper surface of the power transmission device 103. In addition, an alternating voltage generating circuit 13 is provided inside the power transmission device 103 and applies an alternating voltage between the high-voltage side conductor 11 and the low-voltage side conductor 12.

A high-voltage side conductor 21 is formed near the lower surface of the power reception device 201. A low-voltage side conductor 22 is formed near the upper surface of the power reception device 201. In addition, a load circuit 23 is provided inside the casing 20 of the power reception device 201, and a voltage induced between the high-voltage side conductor 21 and the low-voltage side conductor 22 is applied to the load circuit 23.

The auxiliary sheet 301 is a substantially sheet-like member in which a capacitive coupling conductor 31 is coated with an insulator 30, and is similar to those of the first to third embodiments. The auxiliary sheet 301 is placed on the plate material 42, and the power transmission device 103 and the power reception device 201 are respectively placed on the auxiliary sheet 301.

The power transfer system 405 shown in FIG. 10B includes a power transmission device 103, a power reception device 201 and an auxiliary sheet 303. The auxiliary sheet 303 is a substantially sheet-like member in which a capacitive coupling conductor 31 is coated with an insulator 30 and a back conductor 34 is formed on the back surface.

With the above configuration, the back conductor 34 is interposed between the capacitive coupling conductor 31 and the plate material 42, and, therefore, stable coupling characteristic may be obtained without any influence received from the material of the plate material 42. In addition, the back conductor 34 does not interfere with capacitive coupling between the low-voltage side conductor 12 of the power transmission device 103 and the low-voltage side conductor 22 of the power reception device 201. Thus, the degree of coupling does not decrease.

Note that the above described plate material is not limited to a desk, or the like, having a horizontal surface; it may be a ceiling, a wall, or the like. In addition, the auxiliary sheet may be a desk mat, a wallpaper, or the like. In addition, the power transmission device is not necessarily incorporated in advance into a desk, a ceiling, a wall, or the like; it may be retrofitted because it is easy to fit. Furthermore, the power transmission device may be incorporated into various electric devices, such as a notebook personal computer and a keyboard.

According to the above described embodiments, the following advantageous effects may be obtained.

(a) The flexibility of relative positional relationship between a power transmission device and a power reception device is increased.

(b) Because the range of an electric field generated by the power transmission device may be physically expanded, it is possible to expand the working range without increasing the size of the power transmission device. The power transmission device may be reduced in size by that much.

(c) It is not necessary to increase the size of the high-voltage side conductor of the power transmission device, so the power transmission device may be standardized.

(d) It is not necessary to generate excessive electric power to transfer electric power to a load located remote from the power transmission device. In addition, it is not necessary to generate redundant electric power, so a loss may be reduced.

(e) The shape of the auxiliary sheet may be selectively designed, the auxiliary sheet may be formed to be thin and flexible, and may be used for a curved surface, or the like. Thus, the flexibility in terms of appearance design and machining.

REFERENCE SIGNS LIST

T transformer
10 casing
11, 21 high-voltage side conductor
12, 22 low-voltage side conductor
13 alternating voltage generating circuit
20 casing
23 load circuit
26 control circuit
27 secondary battery
28 rectifying smoothing circuit
29 low-voltage circuit portion
30 insulator
31 to 33 capacitive coupling conductor
34 back conductor
41, 42 plate material
101 to 103 power transmission device
201 power reception device
301 to 303 auxiliary sheet
401 to 405 power transfer system

The invention claimed is:

1. A power transfer system comprising:
a power transmission device having a power transmission capacitive coupling electrode that includes a power transmission high-voltage side conductor and a power transmission low-voltage side conductor;
a power reception device having a power reception capacitive coupling electrode that includes a power reception high-voltage side conductor and a power reception low-voltage side conductor;
a capacitive coupling conductor that is capacitively coupled to the power transmission high-voltage side conductor and the power reception high-voltage side conductor;
an alternating voltage generating circuit that generates an alternating voltage that is applied between the power transmission high-voltage side conductor and the power transmission low-voltage side conductor; and
a load circuit of electric power induced between the power reception high-voltage side conductor and the power reception low-voltage side conductor.

2. The power transfer system according to claim 1, wherein the capacitive coupling conductor is a sheet material including a conductive film or a conductive thin wire coated with an insulating film.

3. The power transfer system according to claim 1, wherein the power transmission capacitive coupling conductor of the power transmission device is a sheet-like conductive electrode that has an impedance value lower than a load impedance of the power reception device and higher than a load impedance of a good conductor.

4. The power transfer system according to claim 2, wherein the insulating film has: a first layer from the capacitive coupling conductor to a side facing a capacitive coupling conductor of a device at an other side; and a second layer from the capacitive coupling conductor to a side opposite to the side facing the capacitive coupling conductor of the device at the other side, and the first layer and the second layer have different thicknesses.

5. The power transfer system according to claim 4, wherein the first layer has a smaller thickness than the second layer does.

6. The power transfer system according to claim 4, wherein the insulating film has a surface covered with a conductive film or a conductive sheet, the surface being opposite to a surface facing the device at the other side.

7. The power transfer system according to claim 2, wherein the insulating film has: a first layer from the capacitive coupling conductor to a side facing a capacitive coupling conductor of a device at an other side; and a second layer from the capacitive coupling conductor to a side opposite to the side facing the capacitive coupling conductor of the device at the other side, and the first layer and the second layer have different dielectric constants.

8. The power transfer system according to claim 7, wherein the first layer has a higher dielectric constant than the second layer does.

9. The power transfer system according to claim 7, wherein the insulating film has a surface covered with a conductive film or a conductive sheet, the surface being opposite to a surface facing the device at the other side.

10. The power transfer system according to claim 2, wherein the conductive film or the conductive thin wire comprises a woven fabric including a conductive material.

11. The power transfer system according to claim 2, wherein the insulating film has a dielectric constant of about 7 or above.

12. A noncontact charging device comprising:
the power transfer system according to claim 1, wherein
the load circuit includes a rectifying smoothing circuit that rectifies and smoothes an alternating voltage induced between the power reception high-voltage side conductor and the power reception low-voltage side conductor and a charging element that is charged with an output from the rectifying smoothing circuit, and
the power transmission device includes a control circuit that controls the alternating voltage generating circuit to control charging to the charging element or the load circuit is provided with a control circuit that controls the rectifying smoothing circuit to control charging to the charging element.

* * * * *